United States Patent [19]

Huttenhuis et al.

[11] Patent Number: 5,064,211

[45] Date of Patent: Nov. 12, 1991

[54] WHEELCHAIR WITH TILT COMPENSATING SIDE FRAMES

[75] Inventors: Aloysius G. Huttenhuis, Denekamp; Henricus T. J. Janssen, Oldenzaal, both of Netherlands

[73] Assignee: Huka Developments B.V., Oldenzaal, Netherlands

[21] Appl. No.: 475,228

[22] Filed: Apr. 9, 1990

Related U.S. Application Data

[63] Continuation of Ser. No. 163,612, Mar. 3, 1988, abandoned.

[30] Foreign Application Priority Data

Mar. 6, 1987 [NL] Netherlands ........................ 8700549

[51] Int. Cl.[5] ................................................ B62M 1/14

[52] U.S. Cl. .................................................. 280/250.1

[58] Field of Search .................. 280/242.1, 250.1, 647, 280/650, 658, 304.1, 72; 297/DIG. 4

[56] References Cited

U.S. PATENT DOCUMENTS

| | | | |
|---|---|---|---|
| 4,684,149 | 8/1987 | Meyer | 280/250.1 |
| 4,684,171 | 8/1987 | Roy et al. | 280/250.1 |

*Primary Examiner*—Andres Kashnikow
*Assistant Examiner*—Richard Camby
*Attorney, Agent, or Firm*—Allegretti & Witcoff, Ltd.

[57] ABSTRACT

Wheelchair with four wheels, with two side frames (1,2) and a middle frame (3,4) carrying the seat, both side frame (1,2) being connected to each other by means of the middle frame (3,4) in such a way that tilting of one of the side frames in one direction is followed by tilting of the other side frame through the same angle in the other direction, while the middle frame remains stationary.

4 Claims, 1 Drawing Sheet

WHEELCHAIR WITH TILT COMPENSATING SIDE FRAMES

Related Application

This is a continuation of application Ser. No. 163,612, filed Mar. 3, 1988

Background of the Invention

The invention relates to a wheelchair with four wheels, with two sides frames and a middle frame carrying the seat, the two left and the two right wheels being connected to each other in each case by one of the side frames.

Such wheelchairs are generally known in practice. The two side frames are then rigidly connected to the middle frame. The seat forms a rigid unit with a top frame, which is again connected to the middle frame.

In order to obtain a certain flexibility in the underframe, it is possible to connect the side frames to the middle frame via shock absorbers. Another possibility is to make the seat and/or the middle frame itself somewhat flexible, as disclosed in EP-A No. 0,011,812.

A disadvantage of the wheelchair according to EP-A No. 0,111,812 is that the seat deforms during travel, which is uncomfortable for the person in it.

In both cases driving energy, manual or motor, is converted into deformation energy, which results in the drive output decreasing.

A first reason for making a wheelchair frame flexible is to prevent the wheelchair with its passenger from wobbling. On account of their functional limitations, most wheelchair users have poor trunk stability. The movements which the wheelchair makes when following an uneven road surface therefore have to be limited as much as possible. The "tilting effect" is important here. This effect means that, due to the short wheelbase and narrow track width of a wheelchair compared with the total height of structure and passenger, the highest point makes a relatively great horizontal movement as the result of a vertical displacement of a wheel. It has been found in practice that spring suspension of the wheels does not produce the desired results.

A wheelchair is provided with two swivel wheels and two rigid wheels. The rigid wheels are the driven wheels in a manually operated wheelchair and an electric wheelchair. The problem with the swivel wheels is often that they start "shimmying" at a particular speed through a decrease in the wheel pressure. This shimmying depends, inter alia, on the wheel pressure. If a wheelchair is provided with a rigid frame, deformation of said frame can easily cause one of the wheels to have less contact with the road surface, which then results in shimmying and poor directional stability. In order then to ensure that the wheelchair retains good directional stability and that the wheels do not shimmy during its service life, the frame is made somewhat flexible.

However, these measures are not sufficient to ensure constant contact between the wheels and the road surface, which is never flat in practice.

The object of the invention is to improve the flexibility of a wheelchair, and this is achieved according to the invention through both side frames being connected to each other by means of the middle frame in such a way that tilting of one of the side frames in one direction is followed by tilting of the other side frame through the same angle in the other direction, while the middle frame remains stationary!

This connection between left and right side frames can be achieved in various ways.

As a result of this connection, the seat always undergoes less angular displacement than the side frames. Besides, the vertical movements of the four wheels are linked together, with the result that the weight of the wheelchair with passenger is always borne on the four wheels, which in fact gives the wheelchair greater stability than in the case of a frame such as that described in DE-OS No. 27,31,952 and as great stability as the frame described in EP-A No. 0,011,812. Compared with the frame described in this European patent application, this principle has the advantage that the wheel pressure is distributed more uniformly over the four wheels.

According to one embodiment of the invention, both side frames are disposed so that they tilt about a horizontal cross shaft and are connected to each other at a point outside the horizontal cross shaft by a straight, two-armed lever, of which the point of rotation in the center stays in place.

It is also possible to combine the connection between the two side frames with a tilting mechanism for the seat in a circular arc form with the center of gravity of seat and person being the center point. Such a tilting mechanism forms part of Dutch Patent Application No. 8,601,457 filed by Applicants.

According to one embodiment, each side frame is rigidly connected to a circular arc-shaped tilting part, relative to which the seat can be moved, each tilting part being provided with a gear rack, with which a pinion mounted on a shaft can mate, the two shafts lying in line with each other and being connected to each other by a differential mechanism which is capable of converting the rotary movement of one shaft to an equally great rotary movement of the other shaft in the opposite direction.

Brief Description of the Drawing

Two embodiments of the wheelchair according to the invention are shown in perspective in the drawing, in which.

Detailed Description of the Invention

Figure 1:
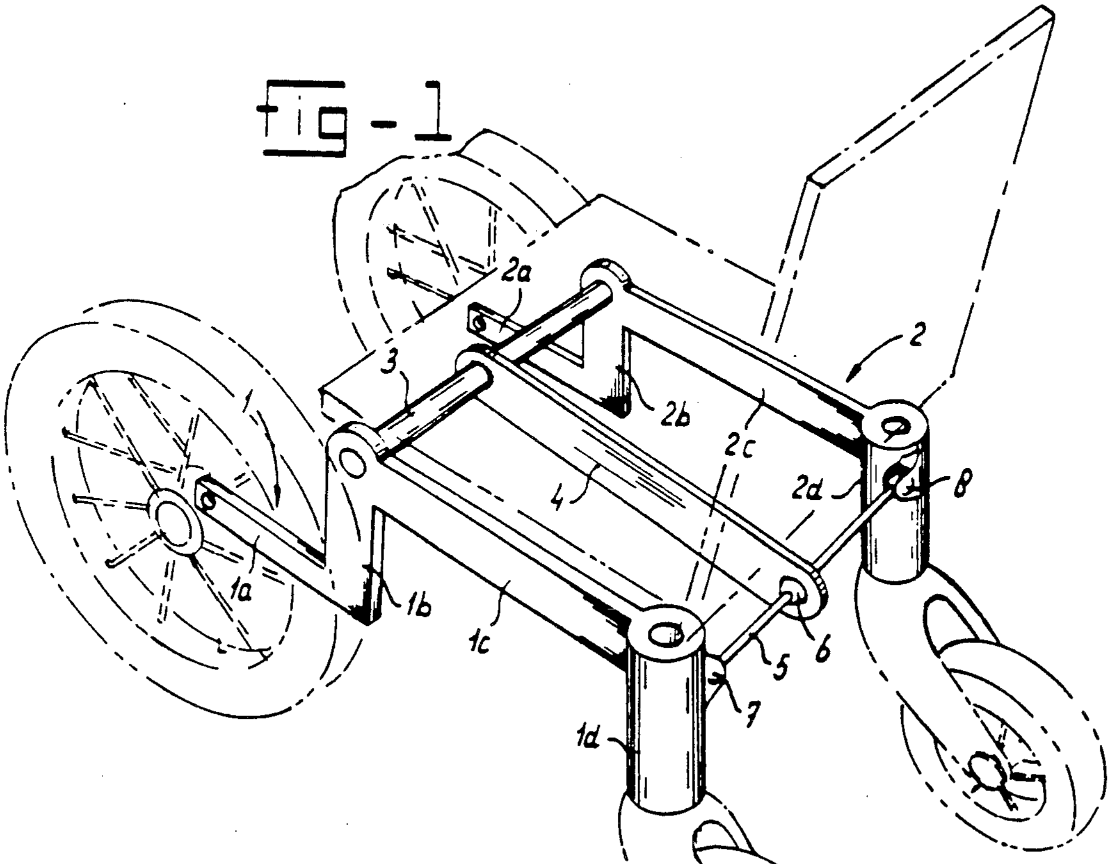
FIG. 1 shows the embodiment with direct connection.

In FIG. 1 the left side frame is indicated by 1. It comprises a horizontal part 1*a* with a suspension for a drive wheel (not shown), a vertical part 1*b*, and a horizontal part 1*c*.

The suspension 1*d* is connected to the end of the horizontal part 1*c* for the vertical swivel axle of a swivel wheel, not shown.

The right side frame is indicated by 2 and comprises the corresponding parts 2*a*, 2*b*, 2*c* and 2*d*.

Each side frame 1, 2 is freely tiltable about a horizontal cross shaft 3. This cross shaft is rigidly connected to the top frame (not shown) of the seat (not shown).

An arm 4 running horizontally and in the lengthwise direction is fixed to said cross shaft 3, and is thus also rigidly connected to the seat.

The coupling mechanism, which in the embodiment shown comprises a cross bar 5 which is tiltably supported in the arm 4 and at the ends is tiltably connected to the wheel suspensions 1*d* and 2*d*, is connected to the free end of this shaft 4. The various connections are formed, for example, by ball-and-socket joints 6, 7 and 8.

When the left drive wheel now moves upwards, the side frame 1 will tilt to the right about the cross shaft 3, and the left swivel wheel will move downwards.

Since the arm 4 remains in place, the right swivel wheel will move up and the right drive wheel will move down over the same distance.

The seat follows approximately half the angle of the road surface; see also FIGS. 9-12, EP-A No. 0,011,812.

The seat now makes a smaller movement than is the case with a rigid frame or a frame of the type described in DE-OS No. 27,31,952.

Figure 2:
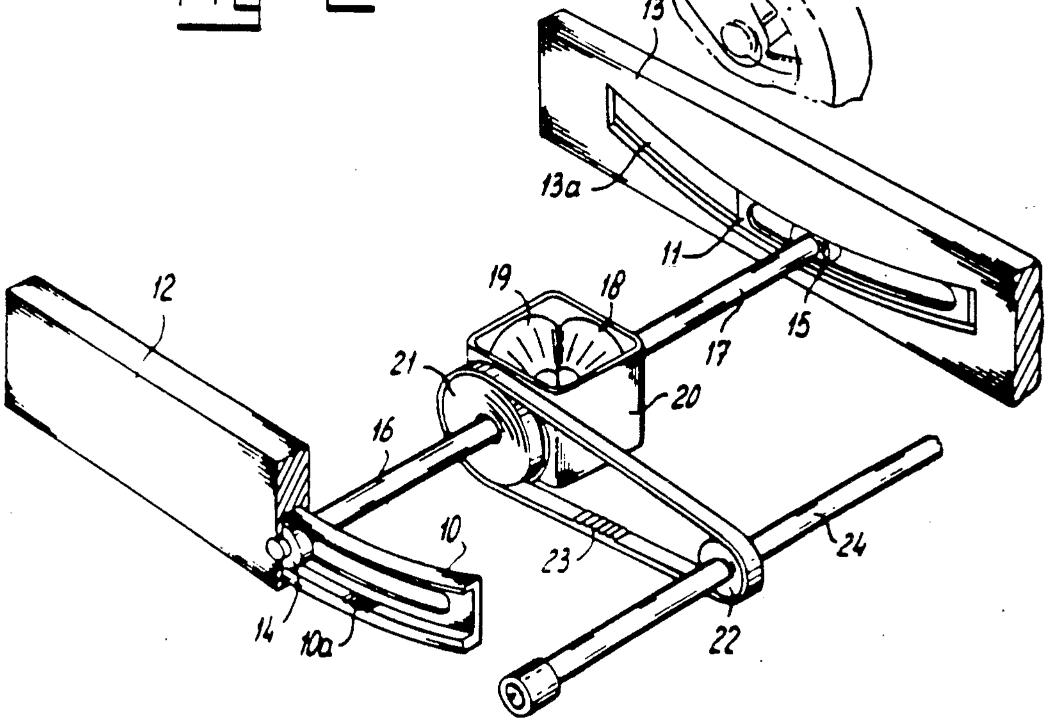
FIG. 2 shows the embodiment used with a tilting mechanism.

The embodiment according to FIG. 2 will now be discussed. The underframe is not shown here, but it also comprises a left side frame 1 and a right side frame 2.

The left side frame 1 is rigidly connected, in a manner not shown, to the tilting part 10, while the right side frame 2 is connected to the tilting part 11.

The two tilting parts 10 and 11 form part of a circular arc and are provided with a gear rack, of which only the gear rack 10*a* is shown.

The side frames of the seat which are rigidly connected to each other are indicated by 12 and 13 and are each provided with circular arc-shaped grooves, of which only the groove 13*a* is shown.

The tilting parts 10, 11 are displaceable in the grooves.

When the user of the wheelchair wishes to assume a different posture, he moves the seat relative to the tilting parts 10, 11. This is the subject of Dutch Patent Application No. 8,601,457.

A pinion 14, 15, fixed on shafts 16, 17 lying in line with each other, mates with each of the gear racks.

These shafts come together in a differential mechanism, which consists of sun gears 18 connected to the shafts 16, 17 and having between them at least one planet gear 19 which is supported in a housing 20.

If this housing 20 is held fast, the shaft 16 will turn in a certain direction when the left side frame 1, and thus the tilting part 10, turns. As a result of the differential mechanism, the shaft 17 will turn through the same angle, but in the opposite direction, and the tilting part 11, and thus the right side frame 2, will thus be turned in the opposite direction.

The housing 20 can be kept immobile by, for example, fixing a toothed wheel 21 on the housing 20.

A toothed belt 23 can run round said wheel 21 and round a second wheel 22.

This second wheel 22 is non-rotatably mounted on a shaft 24, which is supported in self-braking fashion in the side frame of the seat. During deliberate tilting of the seat by the passenger, the shaft 24 is rotated, so that the two shafts 16, 17 drive the pinions 14, 15.

We claim:

1. In a wheelchair having a pair of opposed, longitudinally-extending side frames, a front and a rear wheel connected to each of said side frames, a middle frame disposed between said side frames and a seat mounted on said middle frame, the improvement comprising means for connecting said middle frame to said side frames whereby tilting one of said side frames in one direction causes the opposing side frame to tilt through the same angle in the opposite direction while the middle frame remains stationary, said connecting means comprising a first rigid cross shaft comprising part of said middle frame extending between said side frames and about which said side frames pivot, and a second cross shaft longitudinally spaced from said first cross shaft, said second cross shaft comprising a two armed lever, each arm connecting at one end to one said side frame through a ball joint and at the other end to said stationary middle frame through a ball joint.

2. In a wheelchair having a pair of opposed, longitudinally-extending side frames, a front and a rear wheel connected to each of said side frames, a middle frame disposed between said side frames and a seat mounted on said middle frame, the improvement comprising means for connecting said middle frame to said side frames whereby tilting one of said side frames in one direction causes the opposing side frame to tilt through the same angle in the opposite direction while the middle frame remains stationary, said middle frame comprising a first cross shaft extending between said side frames and pivotally connected thereto, a second cross shaft longitudinally-spaced from said first cross shaft comprising a two-armed lever, a central arm extending between said cross shafts said seat being secured to said first cross shaft and said central arm each of said lever arms connecting at one end to said central arm through a ball joint and at the other end to one said side frame through a ball joint.

3. In a wheelchair having a pair of opposed, longitudinally-extending side frames, a front and a rear wheel connected to each of said side frames, a longitudinally-extending middle frame disposed between said side frames and a seat rigidly mounted on said middle frame, the improvement comprising: means for connecting said middle frame to said side frames constructed and arranged so that tilting one of said side frames in one direction causes the opposing side frame to tilt through the same angle in the opposite direction while the middle frame remains in place, said connecting means including a first cross shaft means extending between said side frames and about which said side frames pivot, said middle frame being fixed to said first cross shaft means, and second cross shaft means longitudinally spaced from said first shaft means and including arm means and ball joint means for titably connecting said arm means at one end to one said side frame and at the other end to said middle frame.

4. In a wheelchair having a pair of opposed, longitudinally-extending side frames, a front and a rear wheel connected to each of said side frames, a longitudinally-extending middle frame disposed between said side frames and a seat mounted rigidly on said middle frame, the improvement comprising: means for connecting said middle frame to said side frames constructed and arranged so that tilting one of said side frames in one direction causes the opposing side frame to tilt through the same angle in the opposite direction, while the middle frame remains in place, said connecting means including a first cross shaft extending between said side frames and about which said side frames pivot, said middle frame being fixed to said first cross shaft, and cross shaft means longitudinally spaced from said first cross shaft, said cross shaft means comprising a pair of arms each tiltably connected at one end to one of said side frames and at the other end to said middle frame.

* * * * *